United States Patent
McGinn et al.

(10) Patent No.: US 9,830,214 B1
(45) Date of Patent: Nov. 28, 2017

(54) DIAMETER ROUTING AGENT DETECTION OF POLICY SERVER COMMUNICATION FAILURE

(71) Applicant: Sprint Communications Company L.P., Overland Park, KS (US)

(72) Inventors: Ryan J. McGinn, Shawnee, KS (US); Robert Anthony Shober, Overland Park, KS (US); Daniel V. Steinel, Lenexa, KS (US); Anthony Charles Wells, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 188 days.

(21) Appl. No.: 14/693,441

(22) Filed: Apr. 22, 2015

(51) Int. Cl.
G06F 11/00 (2006.01)
G06F 11/07 (2006.01)

(52) U.S. Cl.
CPC ........ G06F 11/079 (2013.01); G06F 11/0709 (2013.01)

(58) Field of Classification Search
CPC .......................... G06F 11/079; G06F 11/0709
See application file for complete search history.

(56) References Cited

U.S. PATENT DOCUMENTS

| | | |
|---|---|---|
| 8,249,551 B2 | 8/2012 | Jones et al. |
| 8,620,263 B2 | 12/2013 | Ravishankar et al. |
| 8,943,209 B2 | 1/2015 | Cervenak et al. |
| 2012/0072585 A1 | 3/2012 | Yang et al. |
| 2013/0250750 A1 | 9/2013 | Nishida et al. |
| 2013/0286843 A1 | 10/2013 | Nishida et al. |
| 2013/0322430 A1 | 12/2013 | Mann |
| 2013/0339783 A1* | 12/2013 | Fernandez Alonso ............... H04L 12/1407 714/4.11 |

(Continued)

FOREIGN PATENT DOCUMENTS

| | | |
|---|---|---|
| CN | 102326430 | 1/2012 |
| WO | 2011099523 | 8/2011 |
| WO | 2011110020 | 9/2011 |

(Continued)

OTHER PUBLICATIONS

3GPP TR 29.816 version 10.0.0. "3rd Generation Partnership Project; Technical Specification Group Core Network and Terminals; Study on PCRF failure and restoration." Sep. 2010.*

*Primary Examiner* — Philip Guyton

(57) ABSTRACT

A Diameter Routing Agent detects a communication failure with a first policy server, and responsively transfers a policy request to a second policy server identifying a data communication session, the communication failure with the first policy server, a first communication policy, a session requirement, and a user communication device. The second policy server responsively processing the identification of the data communication session and the communication failure with the first policy server to accept policy control of the data communication session for the user communication device and transferring a second policy response to the Diameter Routing Agent indicating a second communication policy for the data communication session based on the user communication device and the session requirement. The data communication network exchanges additional user data with the user communication device based on the second communication policy.

18 Claims, 7 Drawing Sheets

(56) References Cited

U.S. PATENT DOCUMENTS

2014/0003225 A1    1/2014  Mann et al.
2015/0236863 A1*   8/2015  Castro Castro ..... H04L 12/1407
                                                       370/259

FOREIGN PATENT DOCUMENTS

WO      2013177704      12/2013
WO      2014146726       9/2014

* cited by examiner

DIAMETER ROUTING AGENT DETECTION OF POLICY SERVER COMMUNICATION FAILURE

TECHNICAL BACKGROUND

Wireless communication systems provide a user device wireless access to communication services. Wireless communication systems allow users to move about and communicate over the air with access communication networks. Wireless communication devices transfer data packets with data communication networks to provide data communication services, such as internet access, media streaming, voice calls, and text messaging. End users pay for a data usage policy which determines which network services and the amount of data the end user is authorized to use. These data usage policies for each end user are monitored so users do not use network services and data they are not authorized to use.

Long-Term Evolution (LTE) is a popular wireless data technology. Using LTE, a wireless User Equipment (UE) exchanges data with a Mobility Management Entity (MME) over an evolved-NodeB (eNodeB) base station. MME transfers a Diameter request message to a Home Subscriber System (HSS) and receives a Diameter Response indicating an Access Point Name (APN) and associated APN information. The MME then transfers the Diameter response message to a Packet Data Network Gateway (P-GW) through a Serving Gateway (S-GW).

Networking protocol elements, such as Diameter Routing Agents can be used to implement real-time credit-control for a variety of end users. Diameter Routing Agents designate software policy servers, such as Policy Charging and Rules Function (PCRF), to determine policy rules in a multimedia network. These software policy servers operate as a network core to query and subscribe charging databases, such as an Online Charging System (OCS) or an HSS to collect charging information and make policy decisions for a network and end users. Credit control messages are used by the Diameter Routing Agent to communicate with servers for a user's account, such as a Credit Control Request (CCR) and a Credit Control Answer (CCA).

When a software policy server is overloaded from other sources or loses connection with a Diameter Routing Agent, the Diameter Routing Agent in no longer able to determine policy and charging rules for an active data session for an end user. While communication policies from an initial policy server may contain enough data to allow an end user to continue using network services for a period of time, this can result in incorrect policies being applied or a loss of service completely during an active data session.

TECHNICAL OVERVIEW

A Diameter Routing Agent detects a communication failure with a first policy server, and responsively transfers a policy request to a second policy server identifying a data communication session, the communication failure with the first policy server, a first communication policy, a session requirement, and a user communication device. The second policy server responsively processing the identification of the data communication session and the communication failure with the first policy server to accept policy control of the data communication session for the user communication device and transferring a second policy response to the Diameter Routing Agent indicating a second communication policy for the data communication session based on the user communication device and the session requirement. The data communication network exchanges additional user data with the user communication device based on the second communication policy.

DETAILED DESCRIPTION

Figure 1:
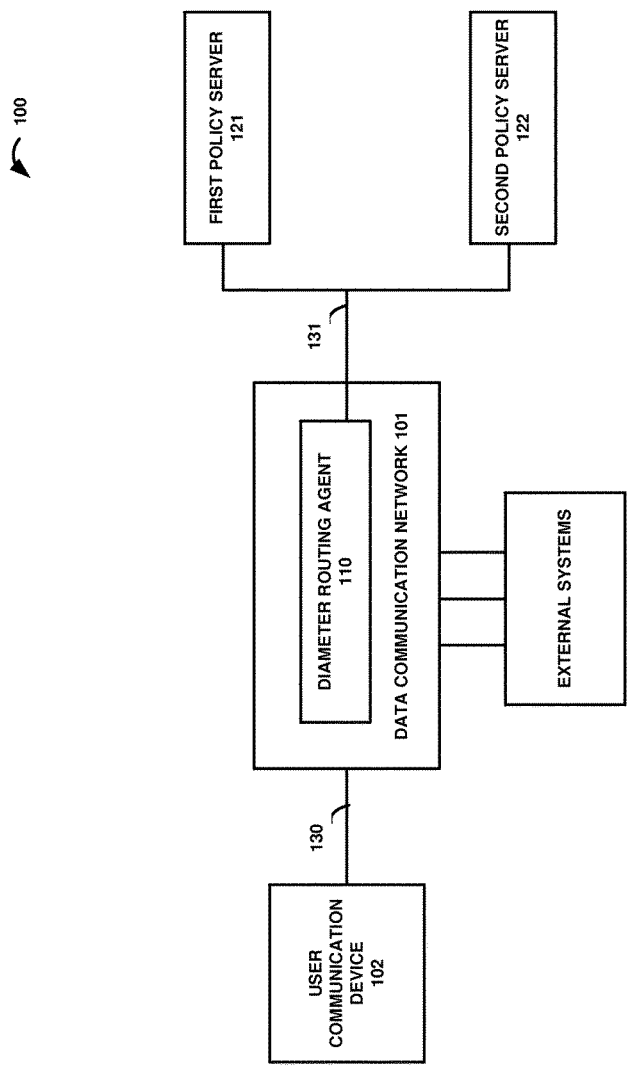
FIGS. 1-3 illustrate a communication system to detect communication failure and switch policy servers for a data communication session.
Figure 2:
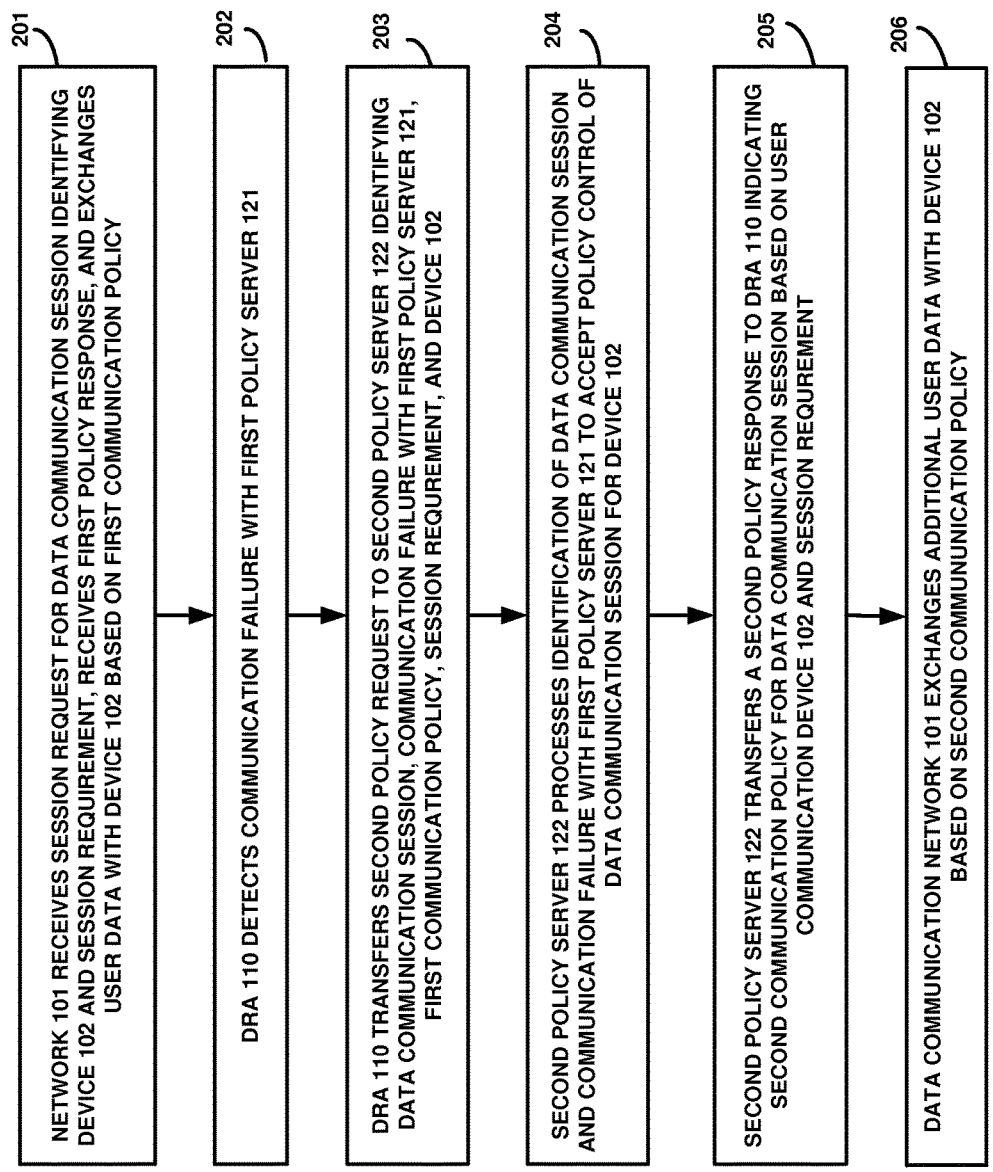
Figure 3:
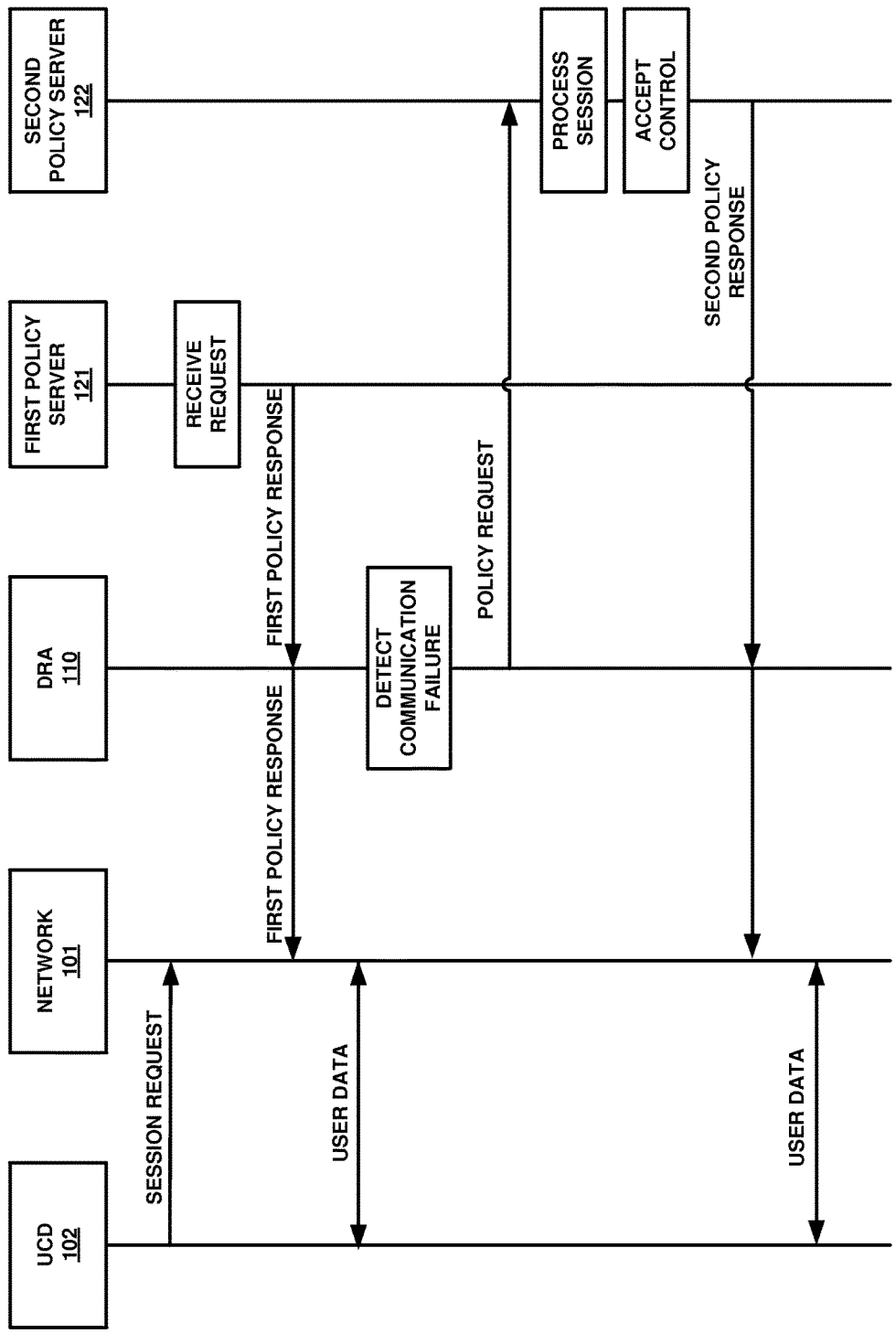

FIGS. 1-3 illustrate communication system 100 to detect communication failure and switch policy servers for a data communication session. Communication system 100 comprises data communication network 101, user communication device 102, first policy server 121, second policy server 122, communication links 130-131 and external systems. Data communication network 101 contains Diameter Routing Agent 110.

Data communication network 101 and user communication device 102 communicate over wireless communication link 130. Diameter Routing Agent 110 communicates with first policy server 121 and second policy server over network communication link 131.

Data communication network 101 transfers data between user communication devices and external systems like Internet, virtual networks, and other external systems. Data communication network 101 comprises network elements, such as access nodes, management nodes, gateway systems, server systems, or other data communication network element—including combinations thereof. For example, data communication network may comprise an evolved-NodeB (eNodeB), a Mobility Management Entity (MME), a Home Subscriber System (HSS), a Serving Gateway (S-GW), and a Packet Data Network Gateway (P-GW). Data communication network 101 may also include other components such as a router, server, data storage system, and power supply. Data communication system 101 may reside in a single device or may be distributed across multiple devices.

User communication device 102 includes communication transceivers, such as antennas, ports, interfaces, processing circuitry, and memory. User communication device 102 may be a telephone, computer, e-book, mobile Internet appliance, wireless network interface card, media player, game console, or some other wireless communication apparatus—including combinations thereof.

Diameter Routing Agent 110 comprises processing circuitry, memory, software, and input/output interfaces that perform authentication of user communication devices, authorization of network services and applications used by the user communication device, and charging users for using network services and applications. Diameter Routing Agent 110 is typically integrated within other network elements, such as routers, gateway systems, databases, controllers, and the like. Diameter Routing Agent 110 may reside in a single network element or may be distributed across multiple devices.

First policy server 121 and second policy server 122 serve policy information for data communication sessions based on user communication devices and session requirements. Policy servers 121-122 comprise computers, bus interfaces, and communication ports that include processing circuitry and memory devices to store and execute various software modules. For example, policy servers 121-122 typically include Policy Charging and Rules Functions (PCRFs) which may be linked to an Online Charging System (OCS), a HSS, or both. An HSS may further include data from a Session Profile Store (SPS).

Wireless communication link 130 communicates over air, space, or some other media. In some examples, portions of data communication network 101, Diameter Routing Agent 110, first policy server 121, and second policy server 122 may use wireless communication link 130 to communicate with different virtual networks using the same hardware system. Wireless communication link may also use protocols, such as Code Division Multiple Access (CDMA), Evolution Data Only (EVDO), Global System for Mobile Communication (GSM), Long Term Evolution (LTE), WiFi (wireless communications using IEEE 802.11x protocols), High Speed Packet Access (HSPA), Worldwide Interoperability for Microwave Access (WIMAX), Internet Protocol (IP), or some other wireless communication formats—including combinations thereof. Wireless link 130 could be a direct link or may include intermediate networks, systems, or devices.

Network communication link 131 communicates over air, space, glass, metal, or some other media. Network communication link 131 may use various protocols, such as Synchronous Optical Networking (SONET), Time Division Multiplex (TDM), Ethernet, IP, or some other communication signaling format—including combinations thereof. Network communication link 131 could be a direct link or may include intermediate networks, systems, or devices.

In a first operation, data communication network 101 receives a session request for a data communication session identifying user communication device 102 and a session requirement. The data communication session has context, like a Session-Identifier, an International Mobile Subscriber Identity (IMSI), a Network Access Identifier (NAI), an Access Point Name (APN), a Radio Access Technology (RAT) Type, or some other relevant data communication session information. Identification of user communication device 102 may include identifiers such as a Mobile Device Number (MDN), Mobile Identification Number (MIN), Uniform Resource Identifier (URI), IP address, or some other identifier—including combinations thereof. The session requirement comprises various communication parameters, such as IMSI, International Mobile Equipment Identity (IMEI), Electronic Serial Number (ESN), or Mobile Attenuation Code (MAC), to support voice calls, media streaming, text messages, web pages, or some other communication service.

In response to receiving the session request, data communication network 101 receives a first policy response indicating a first communication policy for the data communication session based on user communication device 102 and the session requirement. The first policy response identifies rules for the data communication session, such as assigning a bearer based on traffic type. For example, data communication network 101 may process a first policy response for a voice call by assigning a Quality-of-Service Class Identifier (QCI) to data communication network 101. First policy server 121 typically sends a first policy response after receiving a first policy request from a network, such as data communication network 101. However, first policy server 121 may send a first policy response after receiving a first policy request from a Proxy Call Session Control Function (PCFCF) for an IP Multimedia Subsystem (IMS) media session initiated by another user communication device for user communication device 102.

Data communication network 101 then exchanges user data with user communication device 102 based on the first communication policy. For example, data communication network 101 would add QCI5 for user communication device 102 when user communication device 102 or another user communication device initiates IMS signaling.

In a next operation, Diameter Routing Agent 110 detects a communication failure with first policy server 121. A communication failure may be detected by absence of data packet exchanges to and from first policy server 121, timing out of the data communication session for user communication device 102, or some other indication of inactivity by first policy server 121. Communication failure with first policy server may be caused by first policy server 121 entering an overloaded state, first policy server 121 losing connection, or some other reason Diameter Routing Agent 110 is unable to communicate with first policy server 121.

In response to detecting the communication failure, Diameter Routing Agent 110 transfers a policy request to second policy server 122 identifying the data communication session, the communication failure with first policy server 122, the first communication policy, the session requirement, and user communication device 102. Diameter Routing Agent 110 may select second policy server 122 based on data in the memory of Diameter Routing Agent 110, instructions from first policy server 121, or questioning other policy servers on their ability to serve policy information for user communication device 102, capability to serve additional user communication devices, or proximity to user communication device 102. For example, Diameter Routing Agent 110 may have received an instruction in the first communication policy indicating that second policy server 122 is to be used as a backup policy server if first policy server 121 fails.

In a next operation, second policy server 122 responsively processes the identification of the data communication session and the communication failure with first policy server 121 to accept policy control of the data communication session for user communication device 102. Second policy server 122 transfers a second policy response to Diameter Routing Agent 110 indicating a second communication policy for the data communication session based on user communication device 102 and the session requirement. Second policy server 122 may acknowledge acceptance of control for the data communication session by sending back a policy request receipt or by transferring the second policy response.

Data communication network 101 then exchanges additional user data with user communication device 102 based on the second communication policy. For example, user communication device 102 may have used all of the data allocated in first communication policy and need more to continue a media session. Data communication network 101 would receive the additional data for the data communication session in the second communication policy and exchange the additional user data with user communication device 102. Diameter Routing Agent 110 may replace the hostname of second policy server 122 with the hostname of first policy server 121 which would allow data communication network 101 to remain unaware of the failure of first policy server 121 and the replacement of first policy server 121 with second policy server 122.

In some examples, transferring the policy request comprises transferring a Diameter Credit-Control-Request (CCR) identifying the data communication session, the communication failure with first policy server 121, the first communication policy, the session requirement, and user communication device 102. In other examples, transferring the second policy response comprises transferring a Diameter Credit-Control-Answer (CCA) identifying the second communication policy.

In some examples, second policy server 122 queries an OCS to determine the second communication policy for the data communication session. In other examples, second policy server 122 subscribes to an HSS for information related to the data communication session for user communication device 102. For example, an HSS located in data communication network 101 or another data communication network may have policy data for the data communication session loaded from an SPS. In other examples, second policy server 122 subscribes to an OCS for information related to the data communication session for user communication device 102. The subscription to the HSS and/or the OCS allows second policy server 122 to receive notifications for the data communication session which may indicate a data usage cap, whether a data usage cap has been exceeded, automatic signaling services, or any other subscription policy service information.

In some examples, Diameter Routing Agent 110 transfers a first session message to a packet network gateway indicating the first communication policy to direct the exchange of the user data with user communication device 102 and Diameter Routing Agent 110. In this example, Diameter Routing Agent 110 then transfers a second session message to the packet network gateway indicating the first communication and the second communication policy to direct the exchange of the additional user data with user communication device 102. The identification of the policy server may be hidden from the packet network gateway. The packet network gateway may be an S-GW, P-GW, High Speed Access Gateway (HSPA-GW), High Rate Packet Data Gateway (HRPD-GW), Evolved Packet Data Gateway (ePDG), Multimedia Broadcast Multicast Service Gateway (M-GW), or some other type of packet network gateway.

In some examples, second policy server 122 comprises a PCRF server. In other examples, Diameter Routing Agent 110 resides in a P-GW. In other examples, data communication network 101 comprises an LTE network.

FIG. 2 is a flow diagram illustrating an operation of communication system 100 to detect communication failure and switch policy servers for a data communication session. Data communication network 101 receives (201) a session request for a data communication session identifying user communication device 102 and a session requirement. Data communication network 101 receives (201) a first policy response indicating a first communication policy for the data communication session based on user communication device 102 and the session requirement. Data communication network 101 exchanges (201) user data with user communication device 102 based on the first communication policy.

Still referring to FIG. 2, Diameter Routing Agent 110 detects (202) a communication failure with first policy server 121. Diameter Routing Agent 110 responsively transfers (203) a policy request to second policy server 122 identifying the data communication session, the communication failure with first policy server 121, the first communication policy, the session requirement, and user communication device 102. Second policy server 122 responsively processes (204) the identification of the data communication session and the communication failure with first policy server 121 to accept policy control of the data communication session for user communication device 102. Second policy server 122 transfers (205) a second policy response to Diameter Routing Agent 110 indicating a second communication policy for the data communication session based on user communication device 102 and the session requirement. Data communication network 101 exchanges (206) additional user data with user communication device 102 based on the second communication policy.

FIG. 3 illustrates the operation of communication system 100 to detect communication failure and switch policy servers for a data communication session. Data communication network 101 receives a session request for a data communication session identifying user communication device 102 and a session requirement. In response to first policy server 121 receiving a policy request, data communication network 101 then receives a first policy response to Diameter Routing Agent 110 from first policy server 121 indicating a first communication policy for the data communication session based on user communication device 102 and the session requirement. In response to receiving the session request and first policy response, data communication network 101 exchanges user data with user communication device 102 based on the first communication policy.

Still referring to FIG. 3, Diameter Routing Agent 110 detects a communication failure with first policy server 121. In response to detecting the communication failure, Diameter Routing Agent 110 transfers a policy request to second policy server 122 identifying the data communication session, the communication failure with first policy server 121, the first communication policy, the session requirement, and user communication device 102. Second policy server 122 then responsively processes the identification of the data communication session and the communication failure with first policy server 121 to accept policy control of the data communication session for user communication device 102. In response to accepting policy control of the data communication session, second policy server 122 transfers a second policy response to Diameter Routing Agent 110 indicating a second communication policy for the data communication session based on user communication device 102 and the session requirement. Data communication network 101 then exchanges additional user data with user communication device 102 based on the second communication policy.

Figure 4:
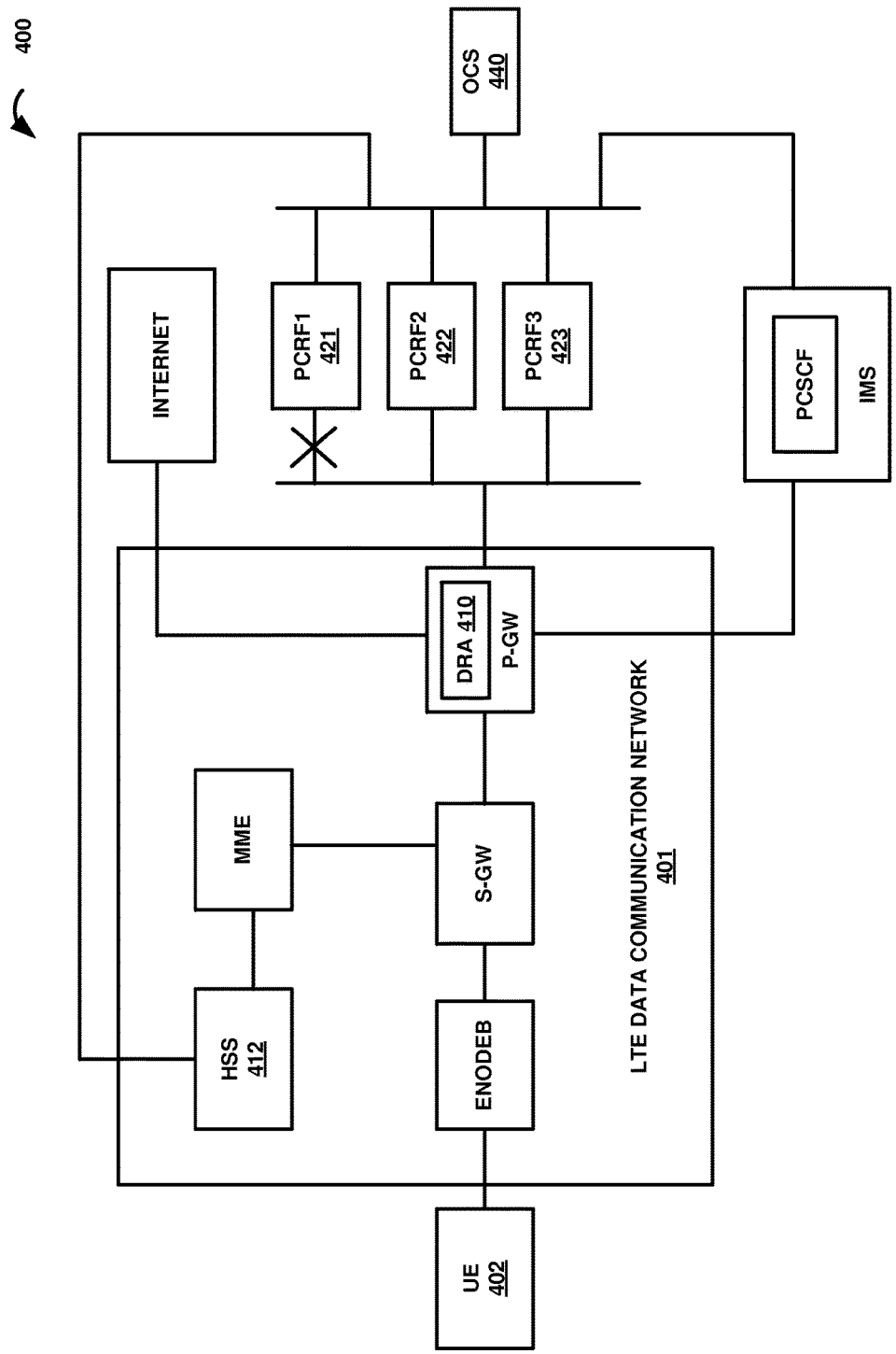
FIGS. 4-5 illustrate an LTE communication system to detect communication failure and switch policy servers for a data communication session.

FIG. 4 illustrates LTE communication system 400 to detect communication failure and switch policy servers for a data communication session. LTE communication system 400 is an example of communication system 100, although communication system 100 may use alternative configurations and operations. LTE communication system 400 includes LTE data communication network 401, User Equipment (UE) 402, PCRF1 421, PCRF2 422, PCRF3 423, OCS 440, Internet, IMS, and PCSCF. LTE data communication network 401 includes eNodeB, S-GW, MME, HSS 412, P-GW, and Diameter Routing Agent 410, which resides in P-GW. IMS delivers IP multimedia services for UE 402 between LTE data communication network 401 and external systems using IP, such as Session Initiation Protocol (SIP). PCSCF processes SIP signaling in the IMS, generates charging records, and provides subscriber authentication and policy decision functions.

Figure 5:
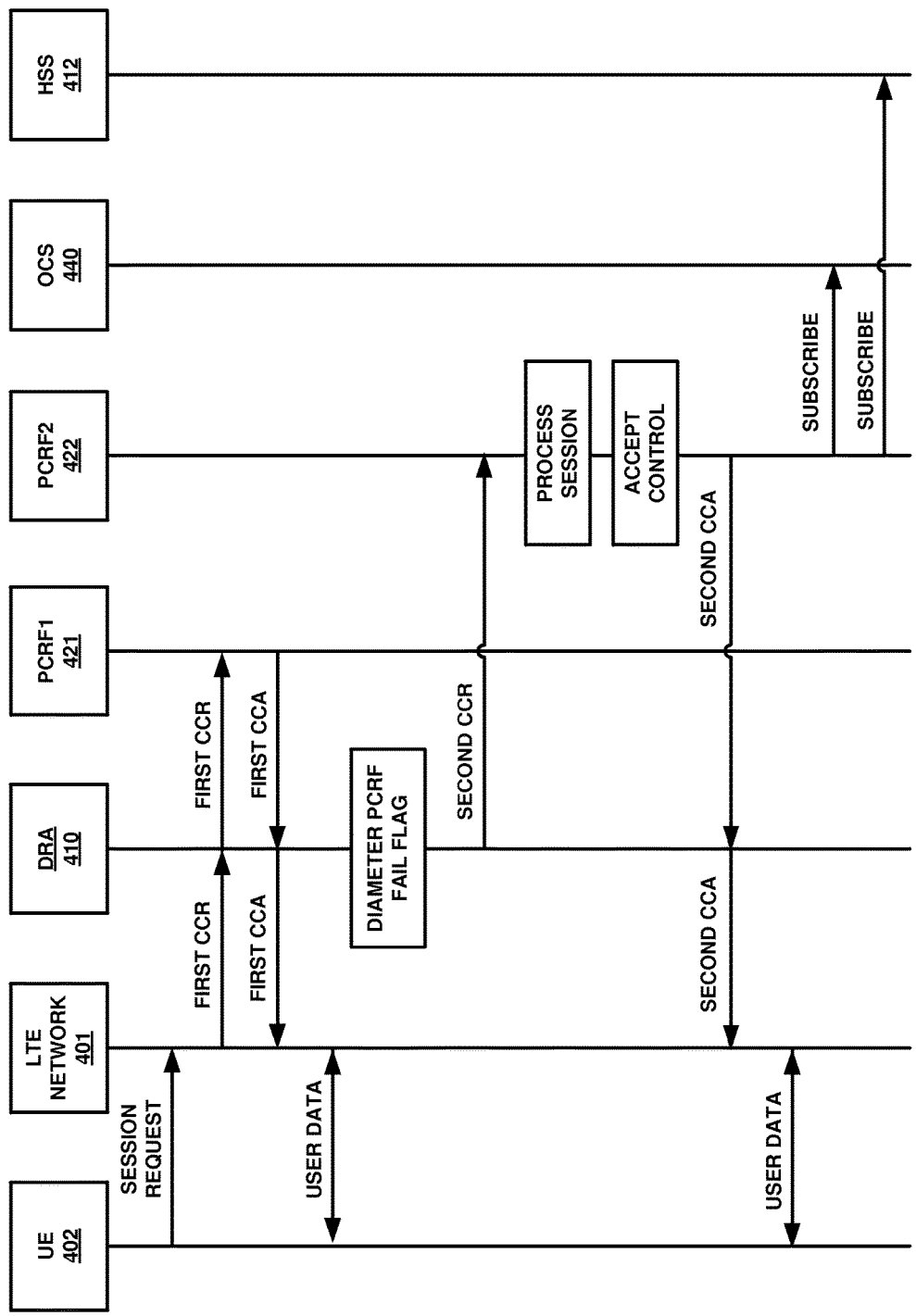

FIG. 5 illustrates an operation of LTE communication system 400 to detect communication failure and switch policy servers for a data communication session. LTE data communication network 401 receives a session request for the data communication session from UE 402 identifying UE 402 and a session requirement. LTE data communication network 401 then transfers a first CCR for the data communication session from Diameter Routing Agent 410 to PCRF1 421. LTE data communication network 401 then receives a first CCA to Diameter Routing Agent 410 from PCRF1 421 indicating a first communication policy for the data communication session based on UE 402 and the session requirement. LTE data communication network 401 then exchanges user data with UE 402 based on the first communication policy.

Still referring to FIG. 5, Diameter Routing Agent 410 detects a communication failure with PCRF1 421 by detecting a Diameter PCRF fail flag. In response to detecting the communication failure, Diameter Routing Agent 410 transfers a second CCR to PCRF2 422 identifying the data communication session, the communication failure with PCRF1 421, the first communication policy, the session requirement, and UE 402. PCRF2 422 responsively processes the identification of the data communication session and the communication failure with PCRF1 421 to accept policy control of the data communication session for UE 402. In response to accepting policy control of the data communication session, PCRF2 422 transfers a second CCA to Diameter Routing Agent 410 indicating a second communication policy for the data communication session based on UE 402 and the session requirement. LTE data communication network 401 then exchanges additional user data with UE 402 based on the second communication policy. In this example embodiment, PCRF2 422 also subscribes to OCS 440 and HSS 412 for information related to the data communication session for UE 402.

Figure 6:
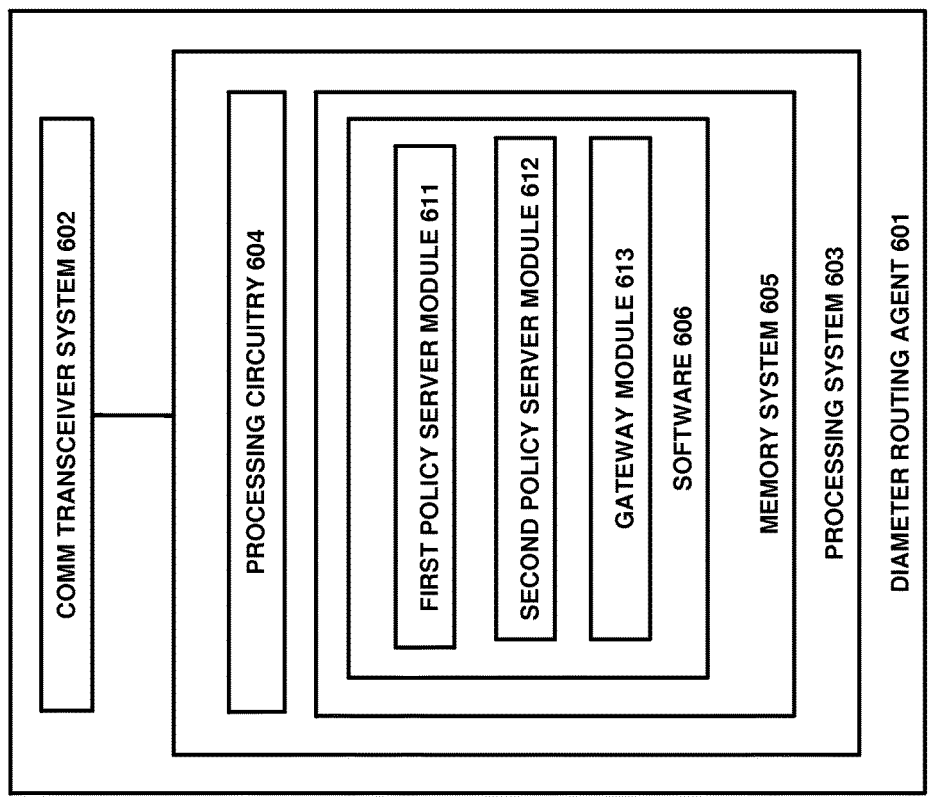
FIG. 6 illustrates a Diameter Routing Agent to detect communication failure and switch policy servers for a data communication session.

FIG. 6 illustrates Diameter Routing Agent 601 to detect communication failure and switch policy servers for a data communication session. Diameter Routing Agent 601 is an example of Diameter Routing Agent 110 and Diameter Routing Agent 410, although these systems may use alternative configurations and operations. Diameter Routing Agent 601 comprises communication transceiver system 602 and processing system 603. Processing system 603 includes processing circuitry 604 and memory system 605 that stores software 606. Software 606 comprises software modules 611-613.

Communication transceiver system 602 comprises components that communicate over communication links such as network cards, ports, RF transceivers, processing circuitry and software, or some other communication components. Communication transceiver system 602 may be configured to use TDM, IP, Ethernet, optical networking, wireless protocols, communication signaling, or some other communication format—including combinations thereof. In particular, communication transceiver system 602 may interface with one of more LTE and non-LTE communication networks, IMS, and LTE control systems to transfer data and messages for a user communication device.

Processor circuitry 604 comprises microprocessor and other circuitry that retrieves and executes operating software 606 from memory system 605. Processor circuitry 604 may comprise a single device or could be distributed across multiple devices—including devices in different geographic areas. Processor circuitry 604 may be embedded in various types of equipment. Examples of processor circuitry 604 include central processing units, application specific processors, logic devices, and/or any type of computer processing devices—including combinations thereof. When executed by processing circuitry 604, software 606 directs processing system 603 to operate Diameter Routing Agent 601 as described herein.

Memory system 605 comprises a non-transitory computer readable storage medium readable by processing system 604 and capable of storing software 606, such as a disk drive, flash drive, data storage circuitry, or some other hardware memory apparatus—including combinations thereof. Memory system 605 can include volatile and non-volatile, removable and non-removable media implemented in any method or technology for storage of information, such as computer readable instructions, data structures, program modules, or other data—including combinations thereof. Memory system 605 may comprise a single device or could be distributed across multiple devices—including devices in different geographic areas. Memory system 605 may be embedded in various types of equipment. In some examples, a computer apparatus could comprise memory system 605 and software 606.

Software 606 may be implemented in program instructions and may be executed by processing system 603. Software 606 comprises computer programs, firmware, or some other form of machine-readable processing instructions. Software 606 may include an operating system, utilities, drivers, network interfaces, applications, or some other type of software. In this example, software 606 comprises first policy server module 611, second policy server module 612, and gateway module 613, although software 606 could have alternative configurations in other examples. When executed by processing circuitry 604, software 606 directs processing system 603 to operate as described herein.

In particular, when executed by processing circuitry 604, first policy server module 611 directs processing system 603 to receive a first policy response indicating a first communication policy for the data communication session. When executed by processing circuitry 604, first policy server module 611 also directs processing system 603 to detect a communication failure with a first policy server. When executed by processing circuitry 604, second policy server module 612 directs processing system 603 to transfer a policy request to a second policy server identifying the data communication session, the communication failure with the first policy server, the first communication policy, the session requirement, and the user communication device. When executed by processing circuitry 604, second policy server module 612 also directs processing system 603 to receive a second policy response indicating a second communication policy for the data communication session. When executed by processing circuitry 604, gateway module 613 directs processing system 603 to transfer session messages to a packet network gateway.

Figure 7:
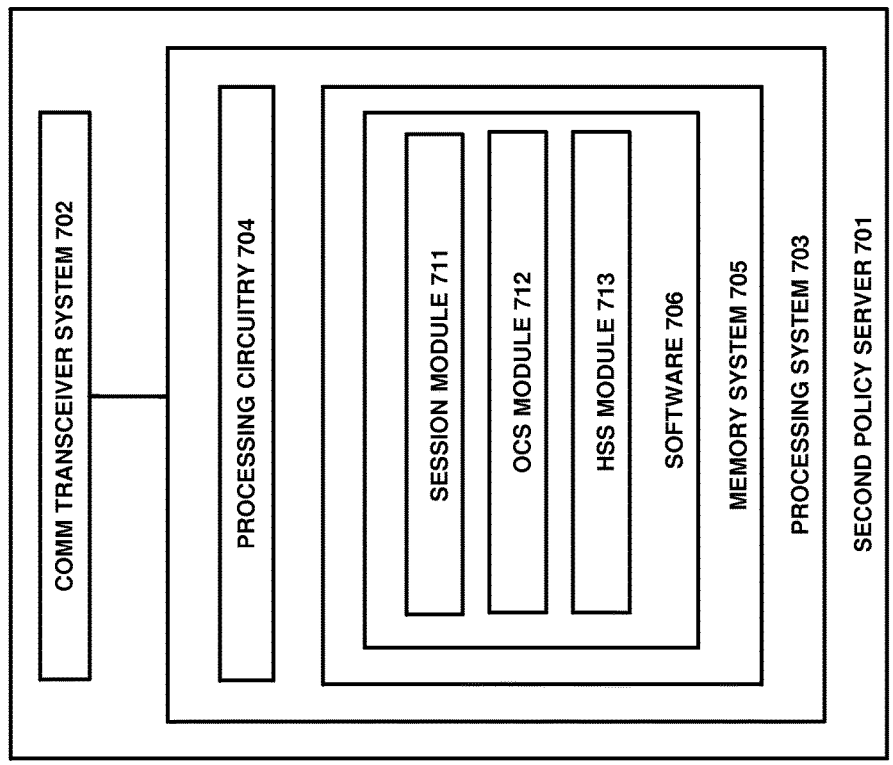
FIG. 7 illustrates a second policy server to detect communication failure and switch policy servers for a data communication session.

FIG. 7 illustrates second policy server 701 to detect communication failure and switch policy servers for a data communication session. Second policy server 701 is an example of second policy server 122 and PCRF2 422, although these systems may use alternative configurations and operations. Second policy server 701 comprises communication transceiver system 702 and processing system 703. Processing system 703 includes processing circuitry 704 and memory system 705 that stores software 706. Software 706 comprises software modules 711-713.

Communication transceiver system 702 comprises components that communicate over communication links such as network cards, ports, RF transceivers, processing circuitry and software, or some other communication components. In particular, communication transceiver system 702 may interface with one of more LTE and non-LTE communication networks, IMS, and LTE control systems to transfer data and messages for a user communication device.

Processor circuitry 704 comprises microprocessor and other circuitry that retrieves and executes operating software 706 from memory system 705. Processor circuitry 704 may comprise a single device or could be distributed across multiple devices—including devices in different geographic areas. Processor circuitry 704 may be embedded in various types of equipment. Examples of processor circuitry 704 include central processing units, application specific processors, logic devices, and/or any type of computer processing devices—including combinations thereof. When executed by processing circuitry 704, software 706 directs processing system 703 to operate second server system as described herein.

Memory system 705 comprises a non-transitory computer readable storage medium readable by processing system 704 and capable of storing software 706, such as a disk drive, flash drive, data storage circuitry, or some other hardware memory apparatus—including combinations thereof. Memory system 705 can include volatile and non-volatile, removable and non-removable media implemented in any method or technology for storage of information, such as computer readable instructions, data structures, program modules, or other data—including combinations thereof. Memory system 705 may comprise a single device or could be distributed across multiple devices—including devices in different geographic areas. Memory system 705 may be embedded in various types of equipment. In some examples, a computer apparatus could comprise memory system 705 and software 706.

Software 706 may be implemented in program instructions and may be executed by processing system 703. Software 706 comprises computer programs, firmware, or some other form of machine-readable processing instructions. Software 706 may include an operating system, utilities, drivers, network interfaces, applications, or some other type of software. In this example, software 706 comprises session module 711, OCS module 712, and HSS module 713, although software 706 could have alternative configurations in other examples. When executed by processing circuitry 704, software 706 directs processing system 703 to operate as described herein.

In particular, when executed by processing circuitry 704, session module 711 directs processing system 703 to process the identification of the data communication session and the communication failure with the first policy server. When executed by processing circuitry 704, session module 711 also directs processing system 703 to accept policy control of the data communication session for the user communication device. When executed by processing circuitry 704, session module 711 directs processing system 703 to transfer a second policy response to the Diameter Routing Agent indicating a second communication policy for the data communication session. When executed by processing circuitry 704, OCS module 712 directs processing system 703 to query an OCS to determine the second communication policy for the data communication session. When executed by processing circuitry 704, OCS module 712 also directs processing system 703 to subscribe to an OCS for information related to the data communication session for the user communication device. When executed by processing circuitry 704, HSS module 713 directs processing system 703 to subscribe in an HSS for information related to the data communication session for the user communication device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data communication network that receives a session request for a data communication session identifying a user communication device and a session requirement, receives a first policy response indicating a first communication policy for the data communication session based on the user communication device and the session requirement, and exchanges user data with the user communication device based on the first communication policy, the method comprising:

a Diameter Routing Agent detecting a communication failure with a first policy server, and responsively transferring a policy request to a second policy server identifying the data communication session, the communication failure with the first policy server, the first communication policy, the session requirement, and the user communication device;

the second policy server responsively processing the identification of the data communication session and the communication failure with the first policy server to accept policy control of the data communication session for the user communication device, transferring a second policy response to the Diameter Routing Agent indicating a second communication policy for the data communication session based on the user communication device and the session requirement, and subscribing to a to a Home Subscriber System (HSS) to receive notifications related to the data communication session for the user communication device; and the data communication network exchanging additional user data with the user communication device based on the second communication policy.

2. The method of claim 1 wherein transferring the policy request comprises transferring a Diameter Credit-Control-Request (CCR) identifying the data communication session, the communication failure with the first policy server, the first communication policy, the session requirement, and the user communication device.

3. The method of claim 1 wherein transferring the second policy response comprises transferring a Diameter Credit-Control-Answer (CCA) identifying the second communication policy.

4. The method of claim 1 further comprising the second policy server querying an Online Charging System (OCS) to determine the second communication policy for the data communication session.

5. The method of claim 1 further comprising the second policy server subscribing to an Online Charging System (OCS) for information related to the data communication session for the user communication device.

6. The method of claim 1 wherein the Diameter Routing Agent transfers a first session message to a packet network gateway indicating the first communication policy to direct the exchange of the user data with the user communication device and the Diameter Routing Agent transfers a second session message to the packet network gateway indicating the first communication policy and the second communication policy to direct the exchange of the additional user data with the user communication device.

7. The method of claim 1 wherein the second policy server comprises a Policy and Charging Rules Function (PCRF) server.

8. The method of claim 1 wherein the Diameter Routing Agent resides in a Packet Data Network Gateway (P-GW).

9. The method of claim 1 wherein the data communication network comprises a Long-Term Evolution (LTE) network.

10. A data communication network that receives a session request for a data communication session identifying a user communication device and a session requirement, receives a first policy response indicating a first communication policy for the data communication session based on the user communication device and the session requirement, and exchanges user data with the user communication device based on the first communication policy, the method comprising:
- a Diameter Routing Agent configured to detect a communication failure with a first policy server, and responsively transfer a policy request to a second policy server identifying the data communication session, the communication failure with the first policy server, the first communication policy, the session requirement, and the user communication device;
- the second policy server configured to responsively process the identification of the data communication session and the communication failure with the first policy server to accept policy control of the data communication session for the user communication device; transfer a second policy response to the Diameter Routing Agent indicating a second communication policy for the data communication session based on the user communication device and the session requirement, and subscribe to a Home Subscriber System (HSS) to receive notifications related to the data communication session for the user communication device; and
- the data communication network configured to exchange additional user data with the user communication device based on the second communication policy.

11. The data communication network of claim 10 wherein the Diameter Routing Agent is configured to transfer a Diameter Credit-Control-Request (CCR) to the second policy server identifying the data communication session, the communication failure with the first policy server, the first communication policy, the session requirement, and the user communication device.

12. The data communication network of claim 10 wherein the second policy server is configured to transfer a Diameter Credit-Control-Answer (CCA) to the Diameter Routing Agent identifying the second communication policy.

13. The data communication network of claim 10 wherein the second policy server is configured to query an Online Charging System (OCS) to determine the second communication policy for the data communication session.

14. The data communication network of claim 10 wherein the second policy server is configured to subscribe to an Online Charging System (OCS) for information related to the data communication session for the user communication device.

15. The data communication network of claim 10 wherein the Diameter Routing Agent transfers a first session message to a packet network gateway indicating the first communication policy to direct the exchange of the user data with the user communication device and the Diameter Routing Agent transfers a second session message to the packet network gateway indicating the first communication policy and the second communication policy to direct the exchange of the additional user data with the user communication device.

16. The method of claim 1 wherein the second policy server comprises a Policy and Charging Rules Function (PCRF) server.

17. The method of claim 1 wherein the Diameter Routing Agent resides in a Packet Data Network Gateway (P-GW).

18. The method of claim 1 wherein the data communication network comprises a Long-Term Evolution (LTE) network.

* * * * *